(12) United States Patent
Davis et al.

(10) Patent No.: US 10,796,004 B1
(45) Date of Patent: Oct. 6, 2020

(54) SPLIT BOOT FOR COMPUTING DEVICES WITH SECURE AND INSECURE STATES

(71) Applicant: Sequitur Labs Inc., Issaquah, WA (US)

(72) Inventors: Philip Charles Davis, Issaquah, WA (US); Philip Attfield, Fall City, WA (US); Michael Doyle, Las Vegas, NV (US); Michael Thomas Hendrick, Renton, WA (US)

(73) Assignee: Sequitur Labs Inc., Issaquah, WA (US)

( * ) Notice: Subject to any disclaimer, the term of this patent is extended or adjusted under 35 U.S.C. 154(b) by 220 days.

(21) Appl. No.: 16/011,485

(22) Filed: Jun. 18, 2018

Related U.S. Application Data

(60) Provisional application No. 62/521,291, filed on Jun. 16, 2017.

(51) Int. Cl.
```
G06F 21/57      (2013.01)
H04L 9/32       (2006.01)
G06F 21/64      (2013.01)
G06F 15/78      (2006.01)
```
(52) U.S. Cl.
CPC ............ *G06F 21/575* (2013.01); *G06F 21/64* (2013.01); *H04L 9/3242* (2013.01); *H04L 9/3247* (2013.01); *G06F 15/7807* (2013.01); *G06F 2221/033* (2013.01)

(58) Field of Classification Search
CPC ..................................................... G06F 21/575
See application file for complete search history.

(56) References Cited

U.S. PATENT DOCUMENTS

| | | | |
|---|---|---|---|
| 2004/0177261 A1* | 9/2004 | Watt | G06F 12/1491 713/193 |
| 2015/0199520 A1* | 7/2015 | Woolley | G06F 21/572 713/2 |
| 2018/0330095 A1* | 11/2018 | Packer Ali | G06F 21/44 |

\* cited by examiner

*Primary Examiner* — Kim Huynh
*Assistant Examiner* — Joshua Neveln
(74) *Attorney, Agent, or Firm* — JRG Attorneys at Law

(57) ABSTRACT

A system for performing coincident boot of computing devices having non-volatile memory and secure and non-secure partitions on the same System on Chip (SoC) or on a similarly capable computing device with secure division and separation of sensitive memory resources, secure protection of intellectual property during boot and post-boot, and support for secure interoperations between secure and non-secure states. The system packages components of the boot loader into a single signed and encrypted package. That package is loaded into the non-secure memory where it is verified before being extracted to the secure partition.

7 Claims, 9 Drawing Sheets

SPLIT BOOT FOR COMPUTING DEVICES WITH SECURE AND INSECURE STATES

CROSS-REFERENCE TO RELATED APPLICATIONS

This application is entitled to the benefit of, and claims priority to U.S. Provisional Application 62/521,291 filed on Jun. 16, 2017.

TECHNICAL FIELD

The present invention relates to the technical fields of Integrated Circuit Manufacturing, System on Chip (SoC) Security, Internet of Things (IoT), Microprocessors, Microprocessor Manufacturing, Manufacturing Automation, Automotive Technology, Computer Security, Telecommunications, Digital Communications, and Computer Technology.

BACKGROUND OF THE INVENTION

The computing device type known as a System on Chip (SoC), which contains all or most of the required components for a functional computer on a single integrated circuit (a "chip"), has had increasing deployment in recent times in markets such as the Internet of Things (IoT), for reasons such as typical low-power consumption as well as reduced cost and reduced engineering requirements compared to multi-chip alternatives. Another recent computing development in computing security is that of multi-state processors and microcontrollers with separated secure and non-secure states of operation such as those designed based on the ARM® TrustZone® architecture. It is now also commonplace for SoCs and microprocessors to have two or more processors on the same chip.

When SoCs and many other computers are initialized for operation, one of the critical first steps is that of the "boot", in which the operating system for the computer is loaded into RAM or some form of non-volatile memory. Boot is a crucial initial stage from security and reliability viewpoints as well as from a functional viewpoint, in that it represents an opportunity for insertion of malicious or otherwise corrupted, incorrect, or unintended code and for various low level attacks on the computing system where damage may be hard to prevent once the system has booted, and in some cases can give an attacker access to all or parts of sensitive information and intellectual property that is subsequently utilized or stored in the system. The boot stage is a necessary process but one that is inherently vulnerable to attack.

Various methods have been used to improve the reliability and security of the boot stage. In U.S. Pat. No. 8,458,801 by Furusawa et al, a separate, trusted processor is utilized both to securely provide a boot program to boot memory for a main processor, and to monitor the data written by that processor. Use of a hardware-based root of trust to validate multiple stages of booting in multiple processor SoCs has been described in U.S. Pat. No. 8,775,784 by Diluoffo et al. Defenses against the use of differential power analysis to spy on data written to memory on an SoC, through the use of early stage authentication methods, have been presented by Peterson et al in U.S. Pat. No. 9,230,112. Other methods for verifying boot integrity and for confidential deployment of boot image and customer data on a trusted computer are presented in US patent application publications 2017/0109533 and 2017/0111354. US application publication 2017/0123788 by Pirvu et al further presents methods for patching or otherwise repairing flawed boot code after original loading.

SUMMARY OF THE INVENTION

Technical Problem

Figure 1:
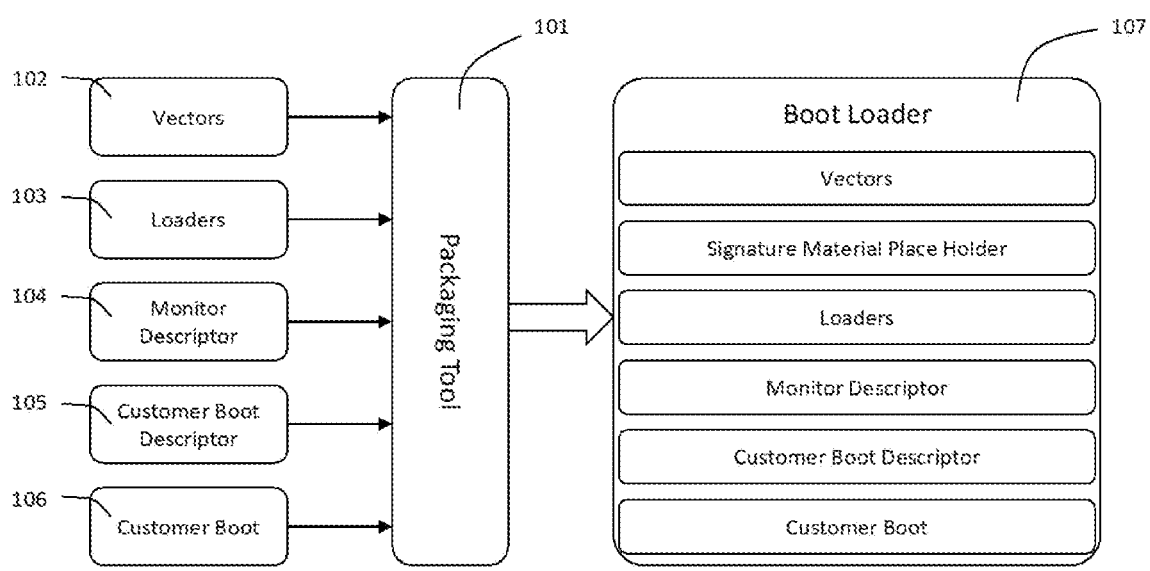
FIG. 1. Boot layout as prepared by the packaging tool, with placeholders.

The problem solved by the present invention is that of secure booting of system on a chip (SoC) or similar hardware configurations, to ensure that the code loaded into memory is what it claims to be and that no tampering could have occurred during the boot loading process.

Solution to the Problem

The present invention uses a split boot approach, albeit in a novel way where the components of the boot loader are first concatenated into one package, the package is then signed and encrypted, the monitor then splits the memory into a secure and a non-secure partition and then the boot loader is loaded into the non-secure partition. The monitor then ensures that only a verified version of the boot loader is loaded into the secure memory and that there is no access to the secure memory from the non-secure memory.

Advantages of this Solution

The invention ensures complete separation of the secure and non-secure partitions in memory and only allows the boot partition to be written to the secure partition when it has been verified for authenticity. This also eliminates the possibility of tampering during the loading process and it allows debugging of code from the non-secure partition without jeopardizing information held in the secure partition.

DESCRIPTION OF THE INVENTION

The present invention is a system and supporting methods for achieving coincident boot and secure post-boot management of secure (SE) and non-secure (NS) states on the same SoC or on a similarly capable computing device, with secure division and separation of sensitive memory resources, secure protection of intellectual property handled during boot and post-boot, and support for certain secure interoperations between NS and SE states. One of several advantages of this "split boot" invention is that it allows debugging of code from the NS state without jeopardizing information held in the secure state. The invention is intended for SoC designs incorporating both secure and non-secure states such as the SAMA5D2 by Microchip Technology Inc., the QorIQ® LS1043A by NXP Semiconductor Inc., and other SoC designs and microprocessor platforms implementing the ARM® TrustZone® architecture, but is not limited to those examples and is suitable for any SoC or other computing platform supporting secure and non-secure states.

Key features of the invention include (a) switching between secure and non-secure boot during the boot process, and (b) secure separation of memory resources for SE and NS states. Beyond standard capabilities of such SoCs, the system of the invention incorporates a custom Monitor component for controlling the interoperation of SE and NS worlds, a custom Packaging Tool for assembling boot components, and other required data for use by a Boot Loader during boot. Details of these components and a representative sequence of steps for their usage are presented in the following text.

In the following, the representative case is that of a party hereinafter labeled "Customer", such as an IoT device vendor using the SoC as a core computing component of their product, with said Customer providing product application code and supplying or otherwise providing a host normal world (NW) operating system, having purchased or otherwise sourced the SoC from an SoC manufacturer. The combined product-specific code, any supporting software components, and NW operating system will be described in the following as "Customer code", although the invention is applicable to any other business cases and situations with a similar form of NW codebase and secure-operations-capable SoC, such as that of a single vendor that might be responsible for creating both the IoT end product and the SoC itself. The following steps are representative of the major steps used in the boot process of the invention:

Step 1. Perform Secure Boot Packaging
Step 2. Perform Secure Boot Encryption and Signing
Step 3. Perform Split Boot-Secure and Normal Principal details of these steps of the invention are as follows.

Step 1: Perform Secure Boot Packaging

Figure 2:
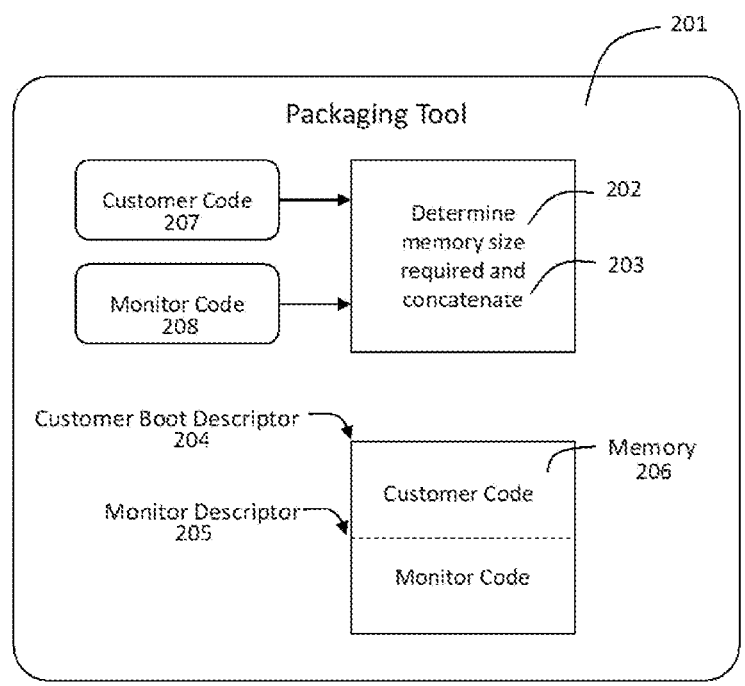
FIG. 2. Details of the processes within the packaging tool.

Initial packaging of contents to be loaded into specific RAM areas during boot is performed by the Packaging Tool (101, 201). The Packaging Tool (101, 201) is a software component used in preparing the layout of the code to be written to certain addresses in the SoC memory during boot. It receives inputs from the customer (102, 103, 104, 105, 106) and packages them into the final boot loader (107). The Packaging Tool performs the following specific functions shown in FIG. 2:

1) Determine the required memory sizes of binary Customer code and Monitor code (202)
2) Combine (concatenate) Customer and Monitor binary codebase (203)
3) Establish descriptors specifying respectively the Customer (204) and Monitor (205) target code start and end addresses in RAM (206) for use during boot loading.

Customer code (207) is specific boot code to the customer while the Monitor (208) verifies that the Customer code is genuine and also relocates the Customer code to the SE at the appropriate time. Monitor code also performs hardware initialization tasks and manages the switch to NS via secure monitor calls (SMC). A vector (102) is a memory location where a loader function is to occur. The result of the use of the Packaging Tool is the Boot Loader (107) layout shown in FIG. 1. The Boot Packing phase determines the size in memory for everything that will be packaged in the boot loader (202), then bundles it together (203) in preparation for the next step. The invention is not specific to the internal operations of the Packaging Tool and a substitute may be employed within the present invention if the outcome memory layout is equivalent.

Step 2: Perform Secure Boot Encryption and Signing

Figure 3:
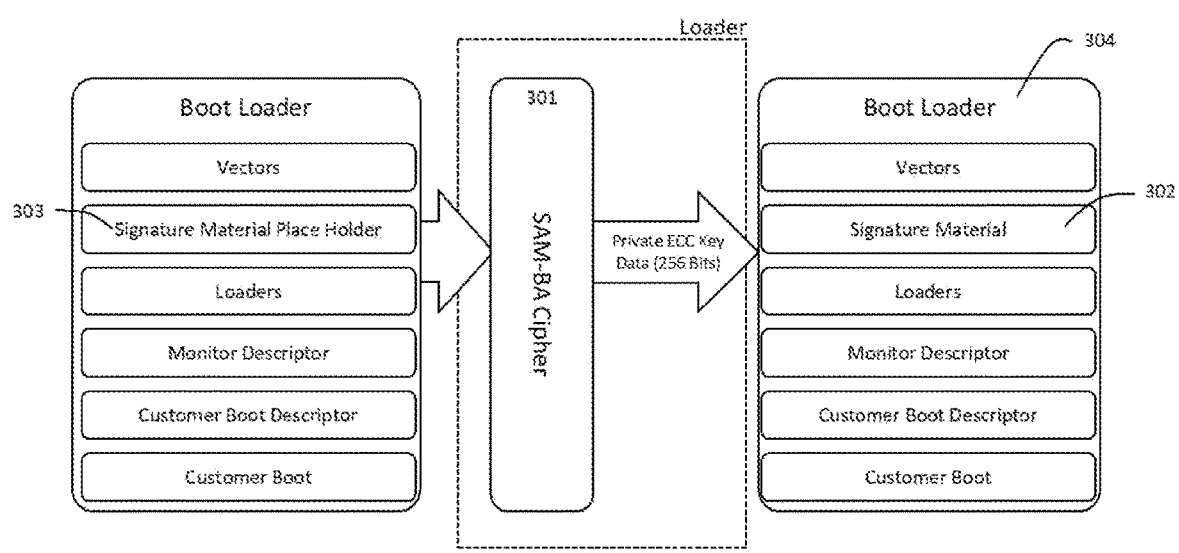
FIG. 3. Inserting signature material during the loading process.
Figure 4:
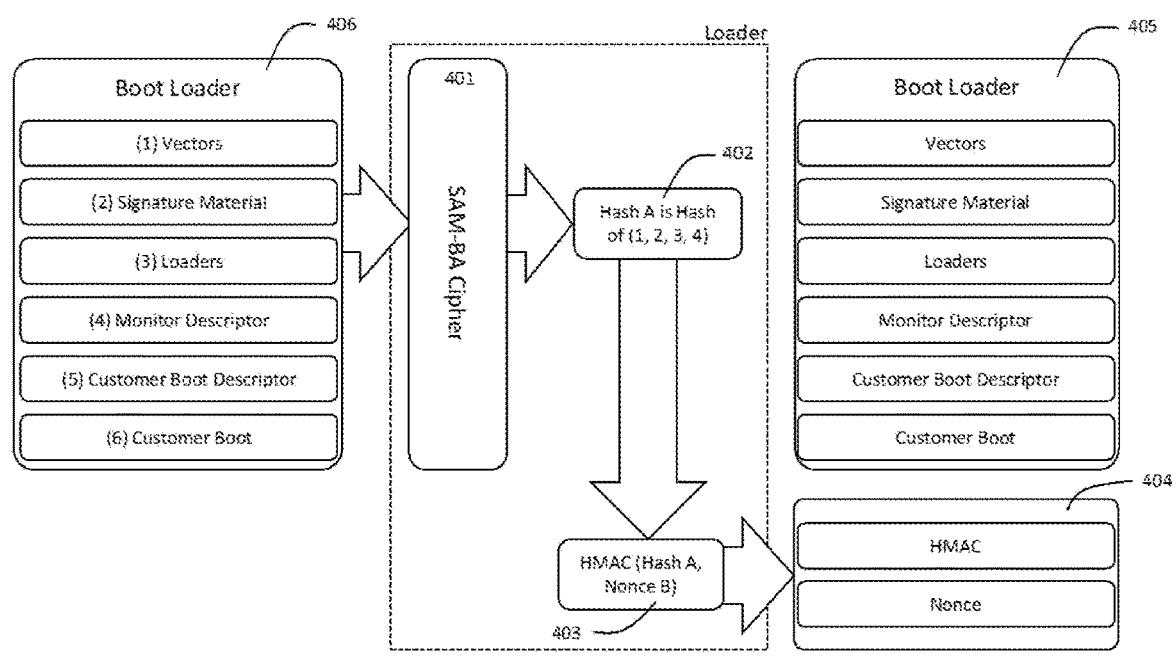
FIG. 4. Defensive hash calculation during the loading process.

After the layout functions of the Packaging Tool have been completed, the next step in preparation for Boot is the encryption of the content of the layout and then the insertion of authentication key(s) or other signatures. This is shown in FIG. 3. In FIG. 3 and subsequent FIGS. 4, 5, and 6, the encryption capability presented is that of the SAM-BA software component (301, 401) by Microchip Corporation, but other encryption capabilities may be substituted within the scope of the present invention. At this stage, unique signature material (302) may optionally be inserted into the payload in place of the signature material place holder (303) so as to uniquely identify the content to be used by the Boot Loader (304) in a later stage. Also, additional protection from malicious actions such as code tampering during boot may optionally be achieved by computing the hash, denoted Hash A (402), of representative portions of the Boot Loader payload (406) as shown in FIG. 4. If a random nonce (403), Nonce B, is also generated, a unique hash-based message authentication code (HMAC) (404) can be computed as a function of Hash A and Nonce B (403), thereby creating a unique key that can later be used to identify the Boot Loader payload (405) and confirm that it is genuine and that it has not been tampered with.

Because the size of the signature material was known at the previous step, it is simply written into that location in the Boot Loader before encryption. The optionally included hash and nonce can be added on to the Boot Loader before encryption.

Figure 5:
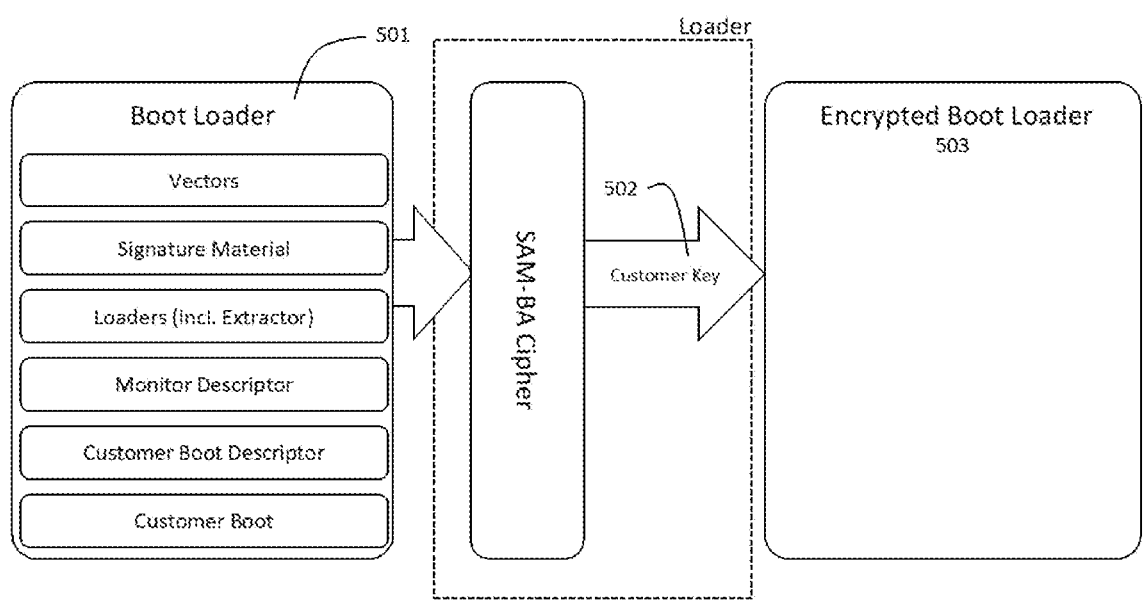
FIG. 5. Encryption of the boot loader during the loading process.
Figure 6:
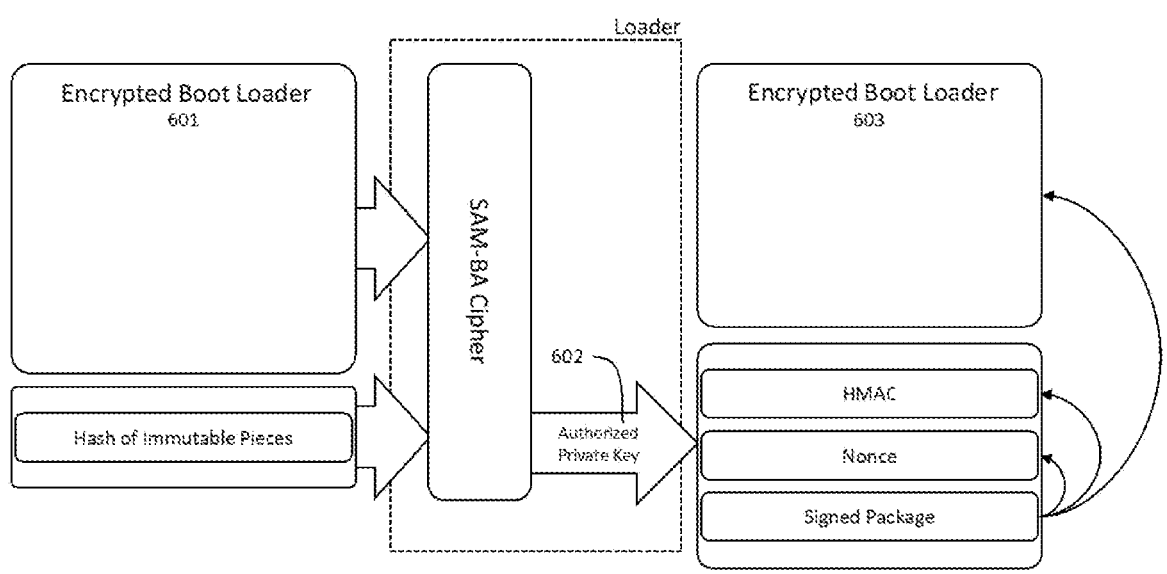
FIG. 6. Sign boot payload package during the loading process.

Next, the Boot Loader payload (501) is encrypted with a Customer-supplied private digital key (502), as represented in FIG. 5. Finally, for the preparation for Boot, the Boot Loader payload (601) is signed with an authorized Private Key (602) as represented in FIG. 6. The result is an encrypted and verifiably genuine Boot Loader payload (603).

Step 3: Perform Split Boot—Secure and Normal

Figure 7:
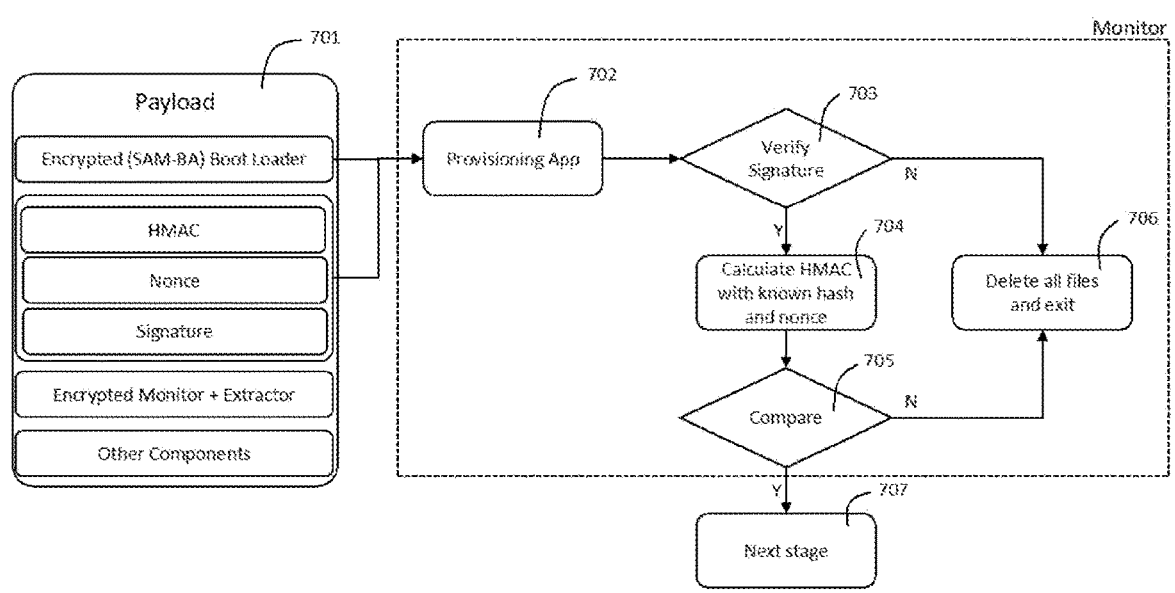
FIG. 7. Monitor functions of boot loader validation and flash to SoC.

After the preparation of the Boot Loader payload in the previous step, the payload is loaded onto non-volatile memory (NVM) on the SoC device in the NS. This may be performed in various ways such as using a memory stick or flash card or other nonvolatile memory device inserted into the SoC host board, or by connections to other storage via various cables or wireless capabilities; the invention is general to all these methods. Only one copy of the Boot Loader is needed. For multicore or multiprocessor configurations, the system can either boot from a single instance of the Boot Loader in a shared NS or each processor or core can boot independently with their own copy of the Boot Loader in their own independent NS partition. Once the payload is on the SoC host board, a sequence of steps such as those presented in FIG. 7 can be performed to verify that the boot payload is genuine, authorized, and in pristine state (untampered with).

The encrypted Boot Payload (701) must have its signature verified (703) via a provisioning application (702). The HMAC is re-calculated using the known hash and nonce (see FIG. 4) (704) and this is compared to the given HMAC (705). If either the signature verification (703) or the HMAC comparison (705) fail, all files are deleted and the process ends (706), thus securing the system from possible tampering. If all steps succeed, then the process continues (707).

Figure 8:
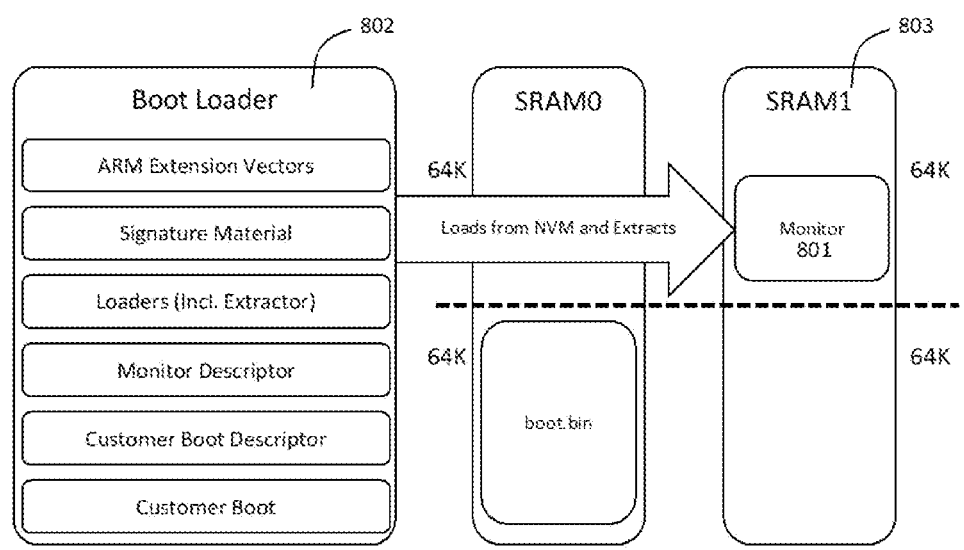
FIG. 8. Decrypt and flash monitor component to SoC during extraction process.
Figure 9:
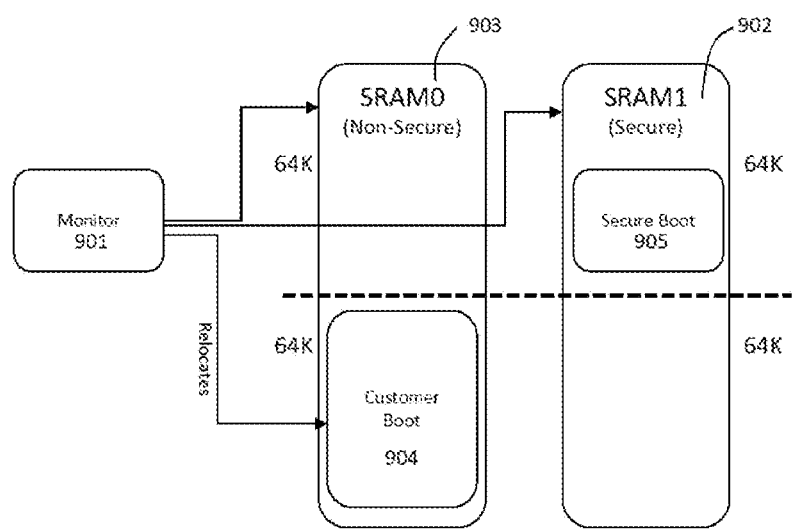
FIG. 9. Unload payload from non-volatile memory to SRAM.

Once the authenticity of the boot payload has been confirmed, portions of the payload can be decrypted and loaded into to specific areas of static RAM (SRAM) associated with the SoC as shown in FIG. 8. Boot operations of the system may proceed using a designated boot processor, in the case of multiple processors in the system. The composition of each payload portion, its destination in SRAM, and the state (NS or SE) of the SoC during this loading is a crucial part of the invention. The Monitor (801) is extracted from the payload (802) into a portion of SRAM (803). Further loading is performed and monitored under the direction of the Monitor component (901) as represented in FIG. 9. The SRAM is partitioned into designated Secure (902) and Non-Secure (903) areas using the Monitor (901). These are later to be made available for any access, respectively, only when the SoC is in Secure or in Non-Secure state. Customer Boot portion (904) of the payload is relocated to the Non-Secure section of SRAM (903), but Secure Boot portion (905) of the payload is located in Secure SRAM (902) and is inaccessible to access from the NS state (903). In this manner, "split boot" is achieved with coincident Secure and Normal boot and secure separation of the SE state SRAM content.

The security of the boot process in the current invention is superior to previous solutions in that the payload is verified as genuine while in the NS partition via Monitor code using hash and nonce precautions. Then, once loaded into the Se, the NS partition has no access to boot steps performed within the SE. The split boot cycle assures that only approved, genuine instructions are ever executed.

INDUSTRIAL APPLICATION

The present invention has application in all aspects of computing where SoC may be in use, or similar architectures where boot loading is a necessary part of the operational process and where security in the operational integrity of the boot loader must be enforced. Internet of Things (IoT), network appliances, smart devices, and smart vehicles are but a few examples of such industries.

CITATION LIST

Furusawa and Nguyen; "High-assurance secure boot content protection", U.S. Pat. No. 8,458,801.
Diluoffo, Dumarot, and Risi; "Secure boot up of a computer based on a hardware based root of trust", U.S. Pat. No. 8,775,784.
Peterson, Flateau, Wesselkamper, McNeil, Moore, Sanders, Hung, & Kochar; "Secured booting of a field programmable system-on-chip including authentication of a first stage boot loader to mitigate against differential power analysis", U.S. Pat. No. 9,230,112.
Shah, Drewry, Spangler, Tabone, Gwalani, & Semenzato; "Firmware verified boot", US Publication 2017/0109533.
Buendgen, O'Connor, & Rooney; "Method for booting and dumping a confidential image on a trusted computer system", US Publication 2017/0111354.
Pirvu, Ali, & Shrivastava; "System and method for modifying firmware used to initialize a computing device", US Publication 2017/0123788.

What is claimed is:

1. A system for performing coincident boot of computing devices, said devices having at least one processor and having a non-volatile memory, the system comprising:
   a packaging tool for combining non-secure and secure boot content into a single encrypted and signed payload having payload components, and having descriptors for each payload component that identify the starting memory locations of each component;
   a monitor coupled to the packaging tool for splitting the non-volatile memory into a secure and a non-secure partition and for verifying the integrity and authenticity of the boot payload components prior to loading;
   a loader coupled to the monitor for loading the signed boot payload into the non-secure partition of the non-volatile memory; and
   an extractor coupled to the loader for extracting secure and non-secure boot portions of the boot payload from the non-secure partition of the memory and for loading the verified payload into the secure partition of the memory, said secure partition of the memory being accessible only from the secure partition of the system.

2. The system of claim 1 wherein the computing device is a system on chip (SoC) device.

3. The system of claim 1 wherein the computing device is a system based on a microprocessor or microcontroller.

4. The system of claim 1 wherein the computing device has multiple processors.

5. The system of claim 1 wherein the encrypted boot payload is signed with a uniquely identifying signature based on a hash function taking as inputs at least a representative portion of the boot payload data, and
   a non-recurring code such as a nonce,
   said identifying signature then being used during the boot process to confirm that the boot payload is authentic.

6. The system of claim 1 wherein the encrypted boot payload is signed with a customer-supplied private key.

7. A method for performing coincident boot of computing devices, said devices having at least one processor and having a non-volatile memory, the steps comprising:
   packaging non-secure and secure boot content into a single encrypted and signed payload having payload components and having descriptors for each payload component that identify the starting memory locations of each component;
   splitting the non-volatile memory into a secure and a non-secure partition;
   verifying the integrity and authenticity of the boot payload components prior to loading;
   loading the signed and encrypted boot payload into the non-secure partition of the non-volatile memory;
   extracting the secure and non-secure boot portions of the boot payload from the non-secure partition of the memory; and
   loading the verified payload into the secure partition of the memory, said secure partition of the memory being accessible only from the secure partition of the system.

* * * * *